Figure 1:
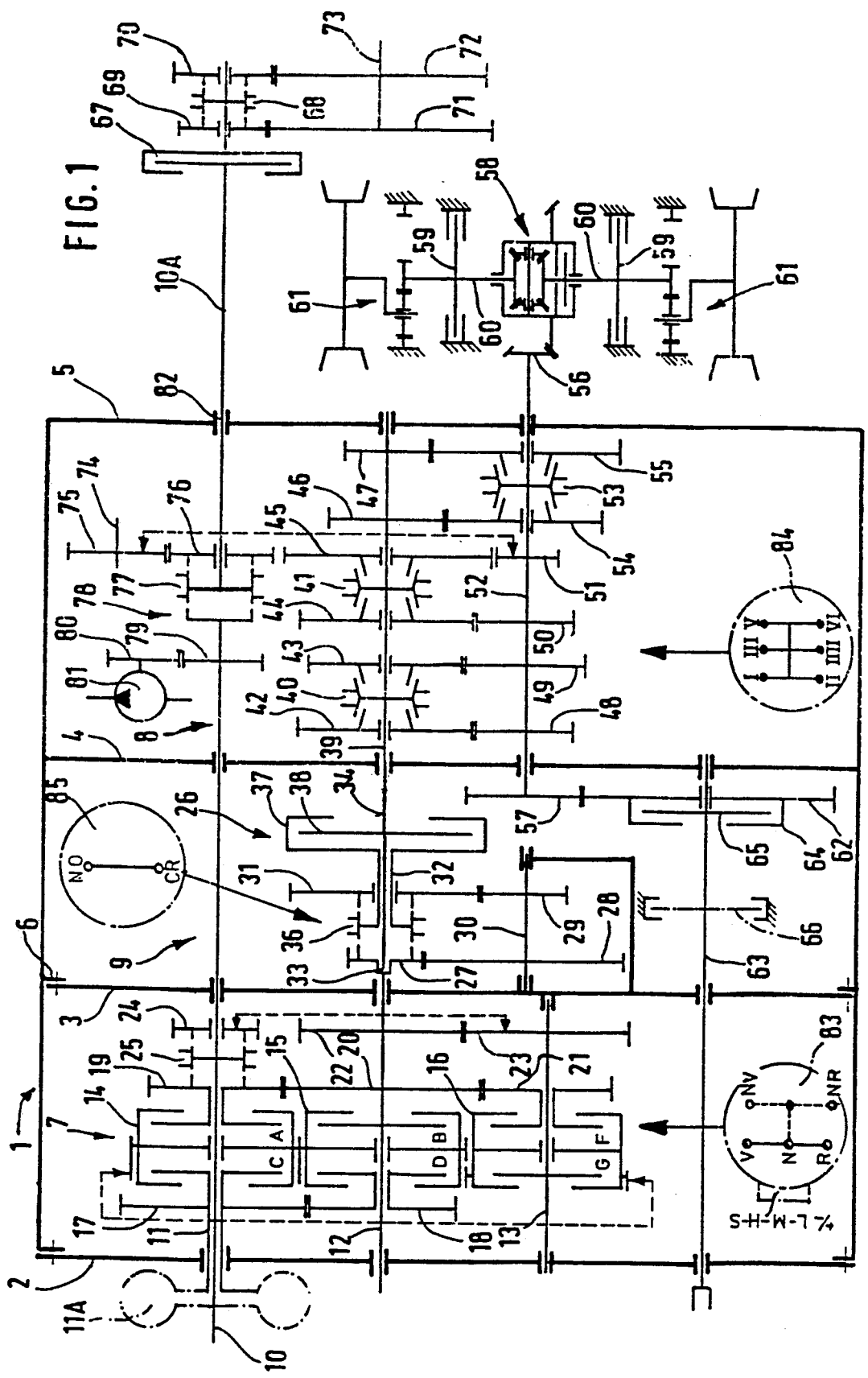

United States Patent [19]

Müller et al.

[11] Patent Number: 5,239,887

[45] Date of Patent: Aug. 31, 1993

[54] MULTI-STAGE SPEED-CHANGE GEAR

[75] Inventors: Franz Müller; Jürgen Pohlenz, both of Friedrichshafen; Hubert Lehle, Meckenbeuren; Edwin Baur; Herbert Simon, both of Friedrichshafen, all of Fed. Rep. of Germany

[73] Assignee: Zahnradfabrik Friedrichshafen AG, Fed. Rep. of Germany

[21] Appl. No.: 778,844

[22] PCT Filed: Jun. 29, 1990

[86] PCT No.: PCT/EP90/01040

§ 371 Date: Dec. 10, 1991

§ 102(e) Date: Dec. 10, 1991

[87] PCT Pub. No.: WO91/00444

PCT Pub. Date: Jan. 10, 1991

[30] Foreign Application Priority Data

Jul. 5, 1989 [DE] Fed. Rep. of Germany ....... 3922053

[51] Int. Cl.$^5$ ............................................. F16H 37/06
[52] U.S. Cl. .................... 74/665 GA; 74/15.4; 74/15.66; 74/331; 74/342; 74/360
[58] Field of Search ............. 74/15.4, 15.66, 15.86, 74/665 GA, 331, 333, 342–345, 357, 360

[56] References Cited

U.S. PATENT DOCUMENTS

| | | | |
|---|---|---|---|
| 4,023,418 | 5/1977 | Zenker | 74/360 X |
| 4,539,856 | 9/1985 | Frost | 74/363 |
| 4,572,026 | 2/1986 | Weiss | 74/360 X |
| 4,716,775 | 1/1988 | Horii et al. | 74/15.4 X |
| 4,750,580 | 6/1988 | Umemoto | 74/665 G AX |
| 4,757,726 | 7/1988 | Yamaguchi | 74/473 R |
| 4,794,807 | 1/1989 | Horii et al. | 74/15.66 X |

FOREIGN PATENT DOCUMENTS

| | | |
|---|---|---|
| 548398 | 12/1985 | Australia . |
| 2645907 | 4/1978 | Fed. Rep. of Germany . |
| 2645957 | 4/1978 | Fed. Rep. of Germany . |
| 2179413 | 3/1987 | United Kingdom . |

*Primary Examiner*—Richard M. Lorence
*Assistant Examiner*—Benjamin Levi
*Attorney, Agent, or Firm*—Davis, Bujold & Streck

[57] ABSTRACT

The invention concerns a multi-step speed-change transmission. An intermediate transmission (9) is situated between an input group (7) and a main group (8). A double gear (28, 29) forms an additional overdrive. The speed-change transmission according to the invention is provided for use in motor vehicles utilized in agriculture or construction.

3 Claims, 2 Drawing Sheets

MULTI-STAGE SPEED-CHANGE GEAR

The invention concerns a multi-step speed-change transmission. Transmissions of this kind are as a rule used for tractors and construction vehicles which must allow jerkless movements at low speeds under light or heavy load and frequent changes of direction, the same as relatively quick road travel for transportation purposes, etc. A summary about the working speeds of tractors most required in agriculture is found, for instance, in K. T. Renius, Traktoren, Verlagsunion Agrar, 1985, page 93.

To satisfy such different conditions of use by means that operate reliably, economize energy and are easy to service, transmissions having a wide range of ratios and many ratio steps are needed which permit an optimal use of the available tractive forces of the engine at all traveling speeds that occur.

DE-C 26 45 907 has disclosed a multi-step transmission. It essentially consists of a splitter group in the form of a finely stepped input group whose fixed gears are on an input shaft driven directly by the main drive and show gearshift clutches and idler gears are all lined up next to each other on a first countershaft and a main group operatively situated behind the input group having a drive shaft situated axially and as an extension of the first countershaft and an output shaft actuatable therewith via gearshift clutches and idler gears and fixed gears meshing therewith. Spatially between the input group and the main group an intermediate transmission is provided containing both a creeping gear set and a reverse gear set whose shift elements are situated successively on the first transmission shaft that carries the gearshift clutches of the input group. At the same time, both the secondary shaft of the reverse-gear shift clutch and the drive shaft of the main group come to lie coaxially and as an extension of the first transmission shaft.

The problem to be solved by the invention is to provide an intermediate transmission, within the speed-change transmission, by which an additional gear is made available with little effect on the gear change operations of the input and main groups.

The solution of said problem consists in providing, axially between a first housing partition on the output side of the input group and before the starting clutch, a free space for installing an intermediate transmission and mounting in this area a positive clutch, wherein said positive clutch radially covers an axial bearing between the first countershaft and the primary shaft and wherein substantially at the height of a reversing shaft there is an intermediate axle with drive-side stop in the first housing wall of the input group upon which intermediate axle is supported a double gear of the intermediate transmission which is engaged with an idler gear on the output side of the sliding sleeve.

Since sufficient space for installing a gearshift clutch is provided between the first housing partition and the starting clutch and the connection of the first countershaft and primary shaft of the starting clutch is produced by a replaceable shaft sleeve, it is possible, when needed, to provide an intermediate transmission without a basic change of construction or lengthening of the transmission or of the clutch and to design always identically all the parts needed therefor.

Even the intermediate axle in the free space with an axial bearing in the connection area and the possibility of accommodating the double gear required in the installation of the intermediate transmission can already be provided from the beginning both for axial support of the first and second housing partition and for passing over oil ducts from the main group to the input group and vice versa.

If an intermediate transmission is installed in said free space and for the shaft sleeve is substituted in combination with fixed gear and idler gear a dog clutch or synchronizer clutch with sleeve carrier on the primary shaft of the starting clutch, it is easily possible, according to the invention, to situate an intermediate ratio before the starting clutch. The weights of the main group with the vehicle situated behind the starting clutch remain nevertheless without affecting the starting clutch during the change of gear. The selected size of the gears to be brought in to engagement with each other in the gearshift clutch and on the intermediate axle decides how the overdrive must be designed.

When designing the intermediate transmission as a simple overdrive with a specific reduction ratio, correspondingly high speeds can be attained without having to give up optimal low speeds for working purposes.

If a synchronizer gearshift clutch is used for engaging and disengaging the intermediate transmission, it is possible quickly and comfortably to carry out, with only one shift step, even extreme changes of speed, for instance, when passing from off road to road and vice versa.

With a dished lower bulge of the first housing partition which has a wall area raised on the output side above the intermediate axle, the intermediate wall is advantageously further strengthened while creating a favorable possibility of support for the intermediate axle and it is prevented that the fixed gear of the intermediate transmission, which as a rule co-rotates idly, triggers unfavorable drag torques in the oil content of the transmission housing.

Figure 2:
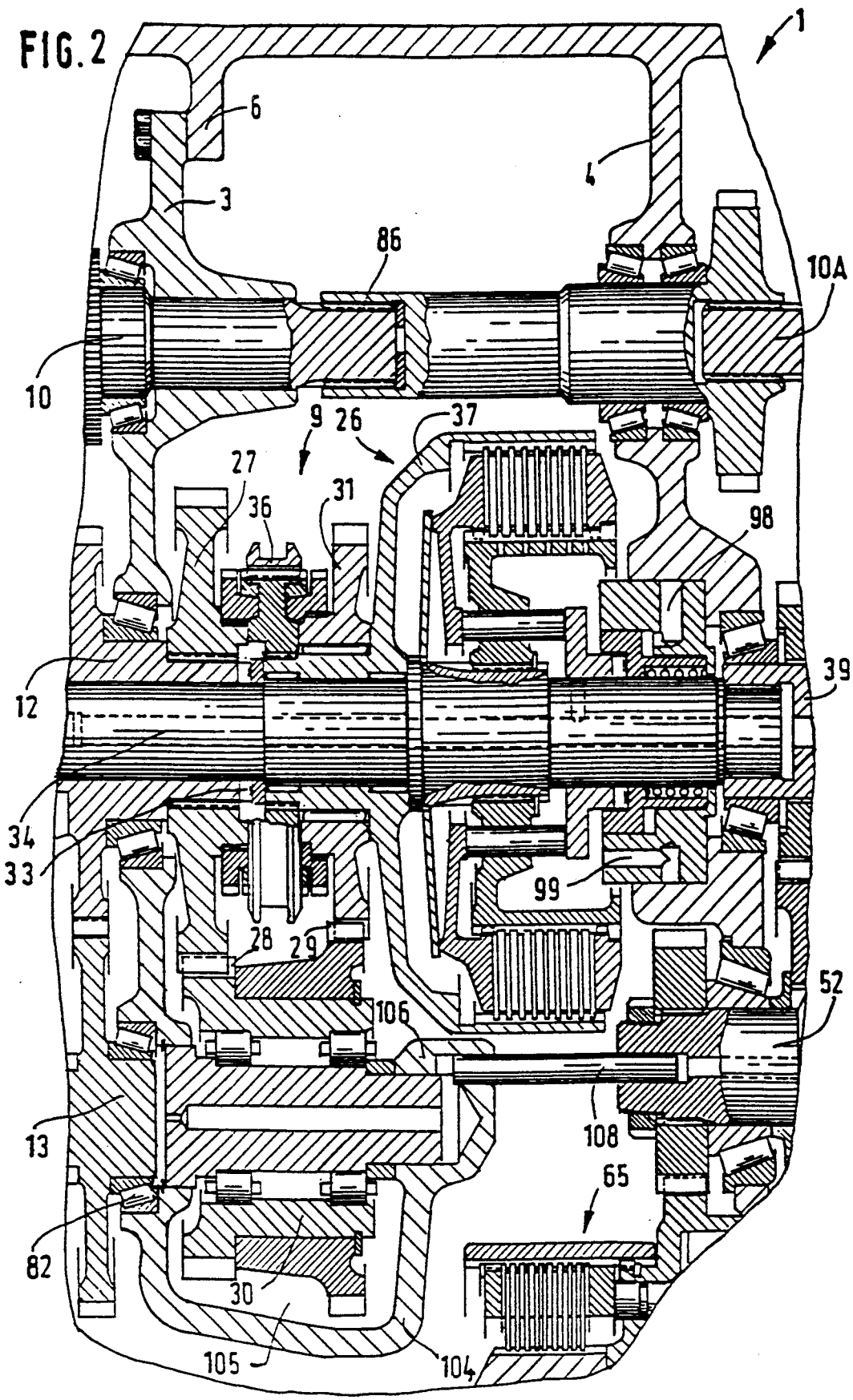

The invention is described in detail herebelow with reference to an embodiment and to the following drawings:

FIG. 1 diagrammatically shows the multi-step speed-change transmission with the preferred design for higher performances with powershift clutches vertically aligned with each other and a reverse gear in the input group;

FIG. 2 shows a constructional embodiment the design of the starting clutch area with an intermediate transmission designed as an overdrive.

In FIG. 1, the whole transmission housing 1 with the engine-side cover 2, a first and a second housing partition 3 and 4 and the rear wall 5 of the housing 1 are diagrammatically shown. The intermediate wall 3, removable from the housing through the cover 2 after loosening an edge flange 6, allows access to the highly stressed parts of the input group 7 without having to open the main group 8 situated behind the second housing partition 4. A free space for an intermediate transmission 9 which in the embodiment consists of a creeping gear step is provided structurally and operatively between input group 7 and main group 8. The main group 8 can thus be mounted fully finished especially between rear wall 5 and intermediate wall 4 prior to installing an intermediate transmission 9 or an input group 7. Since the geometries of the input groups are selected so that powershift clutches A, B, C, D, F, G or synchronizer clutches can be optionally used, the final decision in the equipment is only necessary in the last phase of the assembly. The input group 7 has, in addition to the input shaft 11, two other parallel shafts 12, 13, specifically the countershaft 12 that drives the main group 8 and the reversing shaft 13 for reverse travel. On each of said shafts is respectively a power-shiftable double multi-disc clutch CA, DB and GF of an essentially equal construction and size whose clutch bells 14, 15, 16 are rotatably supported on the respective shafts 11, 12, 13 and which are directly or indirectly in gear with each other via external gearings. Specifically, the bell 14 is constantly in gear with the bells 15 and 16 but the bell 15 not with the bell 16. To this end, the shafts 11, 12, 13 of the input group are arranged to form an equilateral triangle and the external gearing of the bell 15 idles with the external gearing of the bell 16 but meshes, the same as the external gearing of the bell 16, with the external gearing of the bell 14. Each clutch bell is axially divided by a radial web that carries it by its hub in two equal friction disc sets which are separately or jointly activatable against opening spring tensions by separate hydraulic pistons, not specially identified, by means of pressurized fluid from discs present in the shafts 11, 12, 13 while the external discs non-rotatably held by the respective bells 14, 15, 16 are brought into positive engagement with internal discs non-rotatably held respectively by their own internal disc carrier. The latter can be carried along either directly with the respective shaft 11, 12, 13, as is the case in clutches B and G, or indirectly by a hub or hollow shaft rotatable on the respective shaft 11, 12, 13, as is the case in clutches C, A, D and F. The hollow shaft that carries the internal disc carrier of the clutch C is the input shaft 11 which is driven, via any desired vibration damper 11A, by the main drive shaft 10 as soon as the engine, not shown, operates. At the same time, the input shaft 11 carries along in a direction of rotation an idler gear 17 which has a diameter greater than the input-clutch bell 14 and is situated before it on the drive side, which drives an idler gear 18 supported before the counter clutch bell 15 on the drive side and the internal disc carrier of the clutch D connected therewith by a common hub. On the output side, another idler gear 19, connected with the internal disc carrier thereof by a common hub, is situated before the input clutch bell 14 and engaged with a fixed gear 20 having a diameter greater than the counter clutch bell 15 on the countershaft 12 extending into the main group 8 or the clutch shaft 32 coaxial therewith. The fixed gear 20 meshes with a smaller idler gear 2 provided on the reversing shaft 13 on the output side of the reversing-clutch bell 16 and connected with the internal disc carrier thereof by a common hub. Upon the countershaft 12, another somewhat smaller fixed gear 22, is situated after the fixed gear 20 on the output side, which is engaged with a fixed gear 23 secured on the reversing shaft 13 and situated after the idler gear 21 on the output side and has a diameter greater than the diameter of the reversing-clutch bell 16. In the embodiment, a smaller idler gear 24 also meshes with said fixed gear 23 which is situated behind the output-side idler gear 19 of the input clutch 14 on the same shaft 10 and can be brought into positive engagement with the main drive shaft 10 by means of a non-rotatable sliding sleeve 25 on the main drive shaft 10 and corresponding clutch gearings. The same sliding sleeve 25 can also produce a positive engagement of the main drive shaft 10 with the idler gear 19 after the output-side input-clutch bell 14. Thus a bypass operating connection is obtained actuatable forwards or in reverse depending on the OV/OR position for bypassing the powershift clutches dependent on power and hydraulic supply whereby tow starting or a mechanical emergency operation is possible via the gears of the main group 8. This device with the gears 22, 23, 24 is not required when using positive or synchronizer clutches in the input group 7, since then a power or hydraulic failure cannot lead to total blockage of the clutches.

The intermediate transmission 9 which, in the embodiment, is situated according to the invention axially between the input group 7 and a starting and separating (friction) clutch 26 disposed directly in front of the main group 8, can be optionally omitted without changes in the housing, etc., if no special importance is attached to a creeping gear or overdrive.

In the first case, the intermediate transmission consists essentially of a small fixed gear 27 on the output side of the first housing partition 3 on the first countershaft 12 which fixed gear drives a double gear 28/29 on an intermediate shaft 30 parallel to the clutch 26 whose ends are supported in the first and the second housing partitions 3, 4. The double gear 28/29 has, in the case of a creeping gear, a large gear 28 on the drive side and a small gear 29 on the output side. The latter drives a large idler gear 31 on the primary shaft 32 of the starting and separating clutch 26. Said primary shaft 32 is aligned both coaxially with the countershaft 12 with which it has in common an axle bearing 33 and with the drive shaft 34 that forms the second shaft of the starting clutch 26. The primary shaft 32 is fixed or axially supported once more by means of another axle bearing 35 before the internal disc carrier of the starting and separating clutch 26 within the housing thereof. A sliding sleeve 36, non-rotatable with the primary shaft 32 is axially between fixed gear 27 and idler gear 31 and on the inner surfaces of the gears 27 and 31 that face it are corresponding clutch gearings. The sliding sleeve 36 can thus, upon engagement with the gear 27, effect a direct through drive from there into the primary shaft 32 without an increase or decrease of speed or—when engaging with the gear 31 effect at an increased or decreased speed, going through the intermediate shaft 30, a through drive with which all ratio steps of the speed-change transmission can be enlarged or reduced to the selected ratio.

Instead of the above described creeping gear ratio, an overdrive ratio can also be provided in the same place. For this, the fixed gear 27 must of course be large and the drive-side gear 28 of the double gear 28, 29 small, the same as the successive gear 29 must be large and the idler gear 31 small. The reversing clutch 36 is then advantageously a synchronizer clutch in order to take into account the high speeds mostly prevalent when reversing. In the embodiment, the primary shaft 32 drives directly the starting-clutch bell 37 of the starting clutch 26 which is rather designed as an external disc carrier of a wet brake pressure cooled upon actuation with internal discs 38 on the secondary shaft 34. Said secondary shaft 34 is, in the embodiment, the drive-side end of the drive shaft 39 of the main group 8 projecting from the second housing partition 4. On said shaft 39 are two double synchronizer clutches with idler gears 42, 43 and 44, 45 on each side adapted to be carried along by their driven sleeve carriers 40, 41 and two respectively adjacent fixed gears 46, 47. The idler gears 42 . . . 45 mesh with correspondingly dimensioned and placed fixed gears 48, 49, 50, 51 on a second countershaft which serves as drive shaft 52 of the main group 8 and upon, one end of which is also present a third synchronizer clutch with non-rotatable sleeve carrier 53 and coordinated idler gears 54, 55 which with mesh the two fixed gears 46, 47 on the drive shaft 39. In the embodiment, the drive shaft 52 has on both its ends an output gear 56, 57, respectively. The output-side shaft end projecting from the housing rear wall 5 drives a bevel gear and the latter drives a crown gear of a lockable axle differential 58 which, on one side, drives planetary gears 61 by a sun of the rear-axle shafts 60 provided with brakes 59. The output gear 57, projecting on the drive side from the second housing partition 4, is a spur gear which drives an idler gear 62 on a front-axle drive shaft 63. The idler gear 62 also drives the bell of a front-axle change-over clutch 64 designed as an external disc carrier. The internal disc carrier 65 of said clutch is non-rotatable with the front-axle drive shaft 63 which, extending beneath the input group 11, again issues on the end face thereof from the housing cover 2. At the same time, place below the intermediate transmission 9, at least when the gears 28 and 29 are not too large, still remains to situate a shaft brake 66, which has been indicated only with dotted lines in this diagram, on the front-axle drive shaft 63 on the output side of the change-over clutch 64.

In FIG. 2, an intermediate transmission 9 in overdrive has been installed in the free space 9A provided therefor. The input fixed gear 27 has a large diameter, the first gear 28 of the double gear is small and the second gear 29 is large. The output gear 31 is again small and, at the same time, the sliding sleeve 36 is preferably combined with a synchronizer gearshift clutch instead of a simple dog clutch. Great speed differences can be bridged with said synchronizer clutch more comfortably and with less noise. In the embodiment shown in FIG. 2, the front-axle shaft brake 66 has, in addition, been omitted or moved to the inner side of the transmission cover 2 to provide radial space for the large second gear 29 of the double gear. The dished bulge for the double gear 28/29 in 3/104 must then likewise be adequately adapted so that a special shape, when using intermediate transmission 9 with a reduction ratio, be provided for the first housing partition 3 flanged into the housing 1 if the housing partition 3 has not already been designed so that both the creeping gear and the overdrive version of the intermediate transmission 9 have enough radial space.

Reference Numerals 1 transmission housing
2 cover
3 housing partition
4 housing partition
5 ear wall
6 edge flange
7 input group
8 main group
9 intermediate transmission
9A free space
10 main drive shaft
11 input shaft
11A vibration damper
12 countershaft
13 reversing shaft
14 bell
15 bell
16 bell
17 idler gear
18 idler gear
19 idler gear
20 fixed gear
21 idler gear
22 fixed gear
23 fixed gear
24 idler gear
25 sliding sleeve
26 starting and separating clutch
27 fixed gear
28 and
29 double gear
30 intermediate shaft
31 idler gear
32 primary shaft
34 drive shaft
36 sliding sleeve
39 drive shaft
40 sleeve carrier
41 sleeve carrier
42 idler gear
43 idler gear
44 idler gear
45 idler gear
46 fixed gear
47 fixed gear
48 fixed gear
49 fixed gear
50 fixed gear
51 fixed gear
52 drive shaft
56 output shaft
57 output shaft
58 axle differential
59 brake
60 rear-axle shaft
61 wheel head planetary transmission
62 idler gear
63 front-axle drive shaft
64 front-axle change-over clutch
66 shaft brake

We claim:

1. A multi-step speed-change transmission having a friction clutch (26) and at least first and second separate gear transmission groups (7, 8), said first transmission group (8) being a wide-stepped main group with synchronizer gearshift clutches (40, 41, 53) and said second transmission group (7) being a closely stepped in put group mounted for driving said main group and serving as splitter group for fine stepping of at least one of revolution or speed within a desired speed range,
said main group (8) having a drive shaft (39) and said input group having a first countershaft (12) axially aligned with said drive shaft (39), and a main input drive (10, 11) being situated offset and parallel to said first countershaft (12) and being operatively connectable with a power take off shaft (73),
wherein said friction clutch (26) is drivingly connected between said first countershaft (12) and said drive shaft (39) and a first housing partition (3) is located adjacent an output side of said input group,
a free space (9A) is provided, axially between the first housing partition (3) and said friction clutch (26), for installing an intermediate transmission (9), a positive clutch (27, 36, 31) is mounted in said free space and radially bridges an axial bearing (33) located between said first countershaft (12) and a primary shaft (32) which is drivingly connected to said starting clutch (26), and said input group includes a reversing shaft (13) separate and distinct from said first countershaft for reversing the drive direction of said first countershaft (12) and an intermediate axle (30) is located substantially adjacent said reversing shaft (13), said intermediate axle (30) is at least partially supported by the first housing partition (3) and carries a double gear (28, 29), and a first gear of the double gear (28, 29) engages an idler gear (31) provided on the output side of said positive clutch (36).

2. A multi-step speed-change transmission having a friction clutch (26) and at least first and second separate gear transmission groups (7, 8), said first transmission group (8) being a wide-stepped main group with synchronizer gearshift clutches (40, 41, 53) and said second transmission group (7) being a closely stepped input group mounted for driving said main group and serving as splitter group for fine stepping of at lest one of revolution or speed within a desired speed range, said main group (8) having a drive shaft (39) and said input group having a first countershaft (12) axially aligned with said drive shaft (39), and a main input drive (10, 11) being situated offset and parallel to said first countershaft (12) and being operatively connectable with a power take off shaft (73), wherein said friction clutch (26) is drivingly connected between said first countershaft (12) and said drive shaft (39) and a first housing partition (3) is located adjacent an output side of said input group, a free space (9A) is provided, axially between the first housing partition (3) and said friction clutch (26), for installing an intermediate transmission (9), a positive clutch (27, 36, 31) is mounted in said free space located between said first countershaft (12) and a primary shaft (32), and said primary shaft is drivingly connected to said friction clutch (26), said input group includes a reversing shaft (13) separate and distinct from said first countershaft for reversing the drive direction of said first countershaft (12) and an intermediate axle (30) is located substantially adjacent said reversing shaft (13), said intermediate axle (30) is at least partially supported by said first housing partition (3) and carries a double gear (28, 29), and a first gear of the double gear (28, 29) engages an idler gear (31) provided on the output side of said positive clutch (36), and said intermediate transmission (9) is an overdrive transmission with a fixed gear (27) having a diameter substantially equal to a diameter of an input fixed gear (17) supported by said main input drive (10, 11) of said input group, and a gear of the double gear (28, 29) that meshes with said fixed gear (27) is at most about 0.6 times as large as said input fixed gear (17).

3. A multi-step speed-change transmission having a friction clutch (26) and at least first and second separate gear transmission groups (7, 8), said first transmission group (8) being a wide-stepped main group with synchronizer gearshift clutches (40, 41, 53) and said second transmission group (7) being a closely stepped input group mounted for driving said main group and serving as splitter group for fine stepping of at least one of revolution or speed within a desired speed range, said main group (8) having a drive shaft (39) and said input group having a first countershaft (12) axially aligned with said drive shaft (39), and a main input drive (10, 11) being situated offset and parallel to said first countershaft (12) and being operatively connectable with a power take off shaft (73), wherein said friction clutch (26) is drivingly connected between said first countershaft (12) and said drive shaft (39) and a first housing partition (3) is located adjacent an output side of said input group, a free space (9A) is provided, axially between the first housing partition (3) and said friction clutch (26), for installing an intermediate transmission (9), a positive clutch (27, 36, 31) is mounted in said free space and radially bridges an axial bearing (33) located between said first countershaft (12) and a primary shaft (32) drivingly connected to said friction clutch (26), and said input group includes a reversing shaft (13) for reversing the drive direction of said first countershaft (12) and an intermediate axle (30) is located substantially adjacent said reversing shaft (13), said intermediate axle (30) is at least partially supported by the first housing partition (3) and carries a double gear (28, 29), and a first gear of the double gear (28, 29) engages an idler gear (31) provided on the output side of said positive clutch (36), and said positive clutch (36), in one engaged position, directly passes driving power from said first countershaft (12) to said primary shaft (32) without any increase or decrease in driving power.

* * * * *